United States Patent Office 2,781,267
Patented Feb. 12, 1957

2,781,267

WHEY CONCENTRATE

Edwin Traisman, Des Plaines, and Howard L. Fleming, Palatine, Ill., assignors to Kraft Foods Company, Chicago, Ill., a corporation of Delaware No Drawing. Application February 15, 1952,
Serial No. 271,846

5 Claims. (Cl. 99—57)

The present invention relates generally to the manufacture of whey concentrate and more particularly it relates to an improved whey concentrate and food products which are made therefrom.

Large amounts of whey are produced each year by the cheese industry and this whey, if used at all, has been primarily employed in the manufacture of stock feed or, as indicated, has been wasted. However, very small amounts of whey have been concentrated and used in food products such as cheese spreads. Probably the principal reason why whey has not been widely used in food products for human consumption is that concentration of whey for such use causes it to become rough and feel sandy and gritty in the mouth. As a result, if whey is used at all it has comprised only a very small percentage of the food product in which it was incorporated.

Whey has had a still further disadvantage in its characteristic flavor which is considered undesirable in food products. Such whey flavor also prevents it from being used in large percentages in food products and it has been found very difficult to cover up or mask this whey flavor with other flavorings. Therefore, it is readily apparent why only relatively small amounts of whey have been used in food products in the past.

Despite the foregoing disadvantages of whey, it, nevertheless, is a very economical product and has, when concentrated, rather high nutritional value. Moreover, it is a readily available product and it would be commercially advantageous to incorporate whey into various food products in relatively large percentages so as to provide another substantial market for whey which, as pointed out, is often wasted by draining it into sewers.

Accordingly, the principal object of the invention is the provision of an improved whey product. Another object of the invention is to provide an improved whey concentrate which has a smooth and creamy texture, and which does not have the usual strong whey flavor. A still further object of the invention is the provision of new food products which are made from the smooth whey concentrate of this invention.

In general, the smooth whey product is made from whey, which may be cheddar cheese whey, the whey normally containing from 5 to 10 percent solids and including protein, fat, and lactose. This whey is then concentrated to about 50 to about 65 percent solids in a particular manner in order to provide the smooth creamy product of the invention, which product does not have a strong whey flavor. Best results are obtained when the whey is concentrated to from about 55 to 60 percent solids in order to provide a product of the desired characteristics.

The concentration of the whey must be carried out at above about 140° F. in a vacuum greater than about 24 inches of mercury (relative to a 30 inch barometer). However, the temperature at which concentration of the whey is effected should be below the scorchnig point of the whey under the vacuum conditions employed. It is important that the concentration be effected at a temperature above about 140° F. in order that the resulting product be smooth and creamy and it is also important to accomplish concentration under the specified vacuum conditions so as to prevent darkening of the whey concentrate.

The whey may be viscolized or homogenized at any time during the foregoing steps of the process and homogenization, which is not necessary to the practice of the invention, is normally carried out at a pressure between 500 and 3000 pounds per square inch in conventional homogenization equipment.

After the whey has been concentrated to the desired solids content under the above mentioned conditions, the concentrated whey must be rapidly cooled with agitation to a temperature below about 60° F. and such cooling may be accomplished in an ice cream freezer or other rapid cooling equipment. It is of greatest importance that the concentrated whey be cooled as rapidly as possible in order to prevent roughness of the resulting product and to provide a product of smooth creamy texture which does not have a strong whey flavor. We have found that the cooling must be effected in less than a minute and a half, if a most satisfactory product is to be produced, and such cooling is preferably accomplished in less than one minute. The cooled whey concentrate may be packaged in a suitable container such as a glass jar or plastic bag and stored for substantial periods. On the other hand, it may be desirable to dilute the whey concentrate to a lower solids content but we have found that such dilution cannot be carried to a point where the solids content is below 30 percent. In the latter connection, it should be noted that dilution of the concentrate down to 30 percent solids concentration does not interfere with the smoothness of the product and this characteristic makes the product very useful for certain purposes as for example for use in the manufacture of ice cream.

As a particular example of the manufacture of our improved whey concentrate, we took 100 pounds of cheddar cheese whey having a 6 percent solids concentration and fed it into a single-effect evaporator. The whey in the evaporator was then heated to 150° F. and a vacuum of 25 inches of mercury was maintained during concentration of the whey. When the whey had reached a solids concentration of 57 percent, as determined in accordance with standard procedure by a refractometer, the whey was homogenized under a pressure of about 3000 pounds per square inch, the whey leaving the homogenization equipment at a temperature of 145° F. Immediately after homogenization, the whey was pumped into an ice cream freezer and cooled to 58° F. in one minute. The resulting product was poured into five-gallon cans and placed in a 45° cooler for storage purposes. Not only did the product have a smooth creamy texture but it also did not have the strong whey flavor characteristic of whey concentrates known heretofore.

A portion of this whey concentrate was diluted back to a 35 percent solids concentration made into ice cream, the whey solids being substituted for the non-fat milk solids in a conventional ice cream mix which comprised about 15 percent sugar, about 12 percent fat and about 11 percent non-fat milk solids. The ice cream which included the whey concentrate of the invention was smooth and creamy and did not have the rough, gritty feel in the mouth which resulted when whey has been used heretofore. Moreover, the ice cream did not have the strong whey flavor which was present when whey concentrate had been previously used.

Another portion of the whey concentrate of the invention was also employed, without dilution, in the manufacture of salad dressing and it was discovered that the concentrate could be substituted for eggs in the salad dressing while, at the same time, providing a dressing of satisfactory body and texture. Thus, in a salad dressing which comprised about 2.75 percent starch, 41 percent water, 1.52 percent salt, 5.5 percent vinegar, .35 percent mustard, 7 percent egg yolk, 42 percent of glyceride oil, and a dash of spices, the whey concentrate was substituted for the egg yolk to provide a satisfactory salad dressing.

In particular, the dressing was made by placing in a bowl 12 pounds of the whey concentrate having 57 percent solids along with 1¼ pounds salt, the spices, about 3½ pounds vinegar and 5½ ounces of mustard. About 41 pounds of oil was gradually added to the mixture and while the oil was being added the mixture was beaten by a Hobart type mixer. A cooked paste was prepared from 2¾ pounds of starch, 36 pounds of water and some salt. The paste was cooked and after cooling was blended with the oil mixture in a suitable blender. The resulting dressing had good keeping quality, smooth texture, and did not have a whey flavor. Furthermore, since it was not necessary to use egg yolks the dressing was considerably more economical to manufacture than dressings which include egg yolk.

In view of the foregoing, it will be seen that we have prepared a highly improved whey concentrate which may be used in relatively large percentages in many food products and which does not have a strong whey flavor. In addition, we have provided a product which may be substituted for egg yolk in the manufacture of salad dressing to thereby provide a very economical and nutritive food product.

Various features of the invention which are believed to be new are set forth in the following claims.

We claim:

1. A process for manufacturing smooth whey concentrate which comprises concentrating whey having a solids concentration between about 5 and about 10 percent to a solids concentration between about 50 and about 65 percent, concentration being effected at a temperature above about 140° F. and in a vacuum greater than 24 inches of mercury (relative to a 30 inch barometer), cooling the whey from a temperature above about 140° F. to a temperature below 60° F. in a time less than one and a half minutes while agitating said whey.

2. A process for manufacturing smooth whey concentrate which comprises concentrating whey having a solids concentration between about 5 and about 10 percent to a solids concentration between about 55 and 60 percent at a temperature above about 140° F. but below the scorch point of the whey and in a vacuum greater than 24 inches of mercury (relative to a 30 inch barometer), cooling the whey from a temperature above 140° F. to a temperature below 60° F. in less than one and a half minutes while agitating said whey.

3. A process for manufacturing smooth whey concentrate which comprises concentrating whey having a solids concentration between about 5 and about 10 percent to a solids concentration between about 55 and 60 percent at a temperature above about 140° F. but below the scorch point of the whey and in a vacuum greater than 24 inches of mercury (relative to a 30 inch barometer), cooling the whey from a temperature above 140° F. to a temperature below 60° F. in less than one minute while agitating said whey.

4. A process for manufacturing smooth whey concentrate which does not have a strong whey flavor, the process comprising concentrating the whey having a solids concentration between about 5 and about 10 percent to a solids concentration of about 57 percent, concentration being effected at about 150° F. and in a vacuum greater than 24 inches of mercury (relative to a 30 inch barometer), cooling the whey from a temperature above 140° F. to a temperature below 60° F. in less than one minute while agitating said whey.

5. A process for manufacturing smooth whey concentrate which comprises concentrating whey having a solids concentration between about 5 and about 10 percent to a solids concentration between about 55 and 60 percent at a temperature above about 140° F. but below the scorch point of the whey and in a vacuum greater than 24 inches of mercury (relative to a 30 inch barometer), cooling the whey from a temperature above 140° F. to a temperature below 60° F. in less than one minute while agitating said whey, and diluting the concentrate to a solids concentration in excess of 30 percent.

References Cited in the file of this patent

UNITED STATES PATENTS

| | | |
|---|---|---|
| 1,600,573 | Bell | Sept. 21, 1926 |
| 1,763,633 | Simmons | June 10, 1930 |
| 2,119,614 | Webb et al. | June 7, 1938 |
| 2,331,895 | Dunmire | Oct. 19, 1943 |

OTHER REFERENCES

Journal of Dairy Science, vol. 31, No. 2, February 1948, pages 144 to 145.